INVENTOR
Alexander Prichodjko
BY Spencer & Kaye
ATTORNEYS

June 27, 1967 A. PRICHODJKO 3,328,565
NAVIGATION AND POSITION PLOTTING SYSTEM
Filed April 5, 1963 6 Sheets-Sheet 4

INVENTOR
Alexander Prichodjko
BY Spencer & Kaye
ATTORNEYS

United States Patent Office 3,328,565
Patented June 27, 1967

3,328,565
NAVIGATION AND POSITION PLOTTING SYSTEM
Alexander Prichodjko, Oberelchingen, Germany, assignor to Telefunken Patentverwertungs-G.m.b.H., Ulm (Danube), Germany
Filed Apr. 5, 1963, Ser. No. 270,909
Claims priority, application Germany, Apr. 5, 1962, T 21,907
33 Claims. (Cl. 235—150.27)

The present invention relates to a system operating on the transit time principle for producing, measuring and evaluating parallel positional planes for navigation and position plotting purposes, the term "navigational purposes" being intended to comprehend not only actual ship or aerial navigation in the ordinary sense but also measuring purposes for determining and plotting the positions of various targets, crafts and other objects and similar measurements involved, for instance, in the science of geodesy.

Known systems for producing, measuring, and utilizing positional planes have the drawback that, for purely fundamental reasons, they cannot produce parallel positional planes which are sufficiently accurate to meet the practical requirements, and it is, therefore, an object of the present invention to provide a system for producing, measuring, and utilizing, for navigational purposes, positional planes which are exactly parallel to each other, which system is very simple and can be built with conventional circuit components, and which system allows many users to use the system continuously in order to enable such users to solve their own particular navigational problem and to carry out their own position plotting.

It is another object of the present invention to provide a system of the above type which produces a coordinate network forming a square or rectangular grid pattern, or a coordinate network whose coordinates form any desired predetermined angle with each other.

It is yet another object of the present invention to provide a system of the above type which can be adapted so as to allow the position of the unknown point, instead of being determined at that point itself, to be plotted at one of the known points. Such a system is useful, for example, if a given air space is to be kept under surveillance from the ground. In that case, it is not even essential that the plotting be effected precisely at one of the known points, instead, the information can be transmitted to a central computer station which processes the data received from the two ground stations.

With the above objects in view, the present invention resides mainly in a system in which the position of an unknown point is determined with respect to two known points; more particularly, a system in which the distance between the plane of symmetry of the two known points and a plane that is parallel to this plane of symmetry and that contains the unknown point is determined. By using two such systems which are oriented at an angle—preferably a right angle—to each other, a coordinate grid of positional planes is obtained so that the position of the unknown point can be plotted. According to the present invention, there is a transmitter-receiver station at each of the three points. The point at which the plot is to be obtained may generally be considered as the master station; this may be either the unknown point or one of the two known points. The master station transmits a reference time marker signal to which the other stations respond, in general, by themselves transmitting informational time marker signals which, in turn, are received by the master station. The master station then measures various time differences involving the several time marker signals and, on the basis thereof, calculates the distance between the positional plane in which the unknown point is located and the plane of symmetry of the two known points.

Additional objects and advantages of the present invention will become apparent upon consideration of the following description when taken in conjunction with the accompanying drawings in which.

Figure 1:
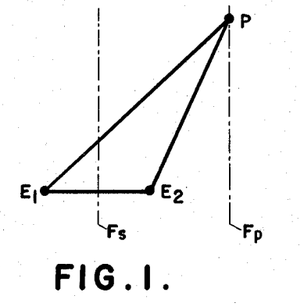
FIGURE 1 is a simplified representation showing the relative position of two known and one unknown transmitter-receiver points.

Referring now to the drawings and to FIGURE 1 in particular, the same shows the relative position of two transmitter-receiver stations located at known points $E_1$ and $E_2$, respectively, and a transmitter-receiver station located at an unknown point P. The position of point P, or, more particularly, the positional plane $F_P$ containing the point P and being parallel to the plane of symmetry $F_S$ of points $E_1$ and $E_2$, is determined as follows, it being assumed that the measurement is to be taken at point P. (Hereinafter, the station at which the measurement is to be taken will be referred to as the master transmitter-receiver, while the transmitter-receivers located at the other points will be referred to as the repeater or slave stations.)

Figure 1A:
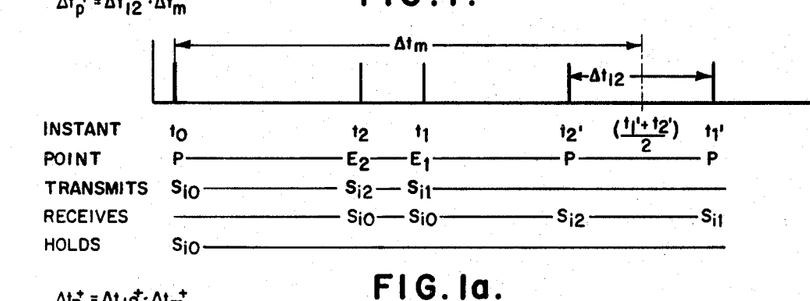
FIGURES 1a, 1b, and 1c show the relationships between various instants of time.

According to the present invention, the system has the following features, as will be explained in conjunction with FIGURE 1a:

(1) A reference time marker signal $S_{10}$ is transmitted at an instant $t_0$ from the first or master transmitter-receiver point P.

(2) The reference time marker signal is received at $t_1$ and $t_2$, respectively, by a pair of slave transmitter-receivers, namely, a second transmitter-receiver located at a point $E_1$ and a third transmitter-receiver located at a point $E_2$, the distance between which points $E_1$ and $E_2$ is known.

(3) The second transmitter-receiver at Point $E_1$ transmits an informational time marker signal $S_{11}$ at the instant $t_1$ at which it receives the reference time marker signal $S_{10}$ that was sent out by the master transmitter-receiver at point P, and the third transmitter-receiver at point $E_2$ transmits an informational time marker signal $S_{12}$ at the instant $t_2$ at which it receives the references time marker signal $S_{10}$ that was sent out by the master transmitter-receiver at point P.

(4) The informational time marker signals $S_{11}$ and $S_{12}$ are received by the first transmitter-receiver at point P at $t_1'$ and $t_2'$, respectively.

(5) A determination is made of the following time differences:

(a) Firstly, the time difference $\Delta t_{12}$ between the instants $t_1'$ and $t_2'$ at which the signals $S_{11}$ and $S_{12}$ are received by the transmitter-receiver at point P, and (b) Secondly, the time difference $\Delta t_m$ which is half the sum of the time difference between the instant $t_0$ and the instant $t_1'$ at which the signal $S_{11}$ is received at P and the time difference between the instant $t_0$ and the instant $t_2'$ at which the signal $S_{12}$ is received at P.

(6) There is formed the product $\Delta t_P' = \Delta t_{12} \cdot \Delta t_m$.

One reference signal $S_{10}$ and the two signals $S_{11}$ and $S_{12}$ derived therefrom, i.e., one reference time marker and the two informational time markers which pertain thereto, together form a time marker group, with only the signals of the same time marker group being used to form the product $\Delta t_P'$.

In the system according to the present invention, the value $\Delta t_P'$ always identifies a particular positional plane which is parallel to the plane of symmetry $F_S$ of the points $E_1$ and $E_2$. The value $\Delta t_P'$ can, in a manner known per se, be determined either by multiplying the absolute value or magnitude of $\Delta t_{12}$ by $\Delta t_m$, i.e., $|\Delta t_{12}| \cdot \Delta t_m$, or by multiplying the complete value $\Delta t_{12}$ (i.e., the value including its algebraic sign) by $\Delta t_m$. In the first case, i.e., when only the magnitude of $\Delta t_{12}$ is considered, the product $\Delta t_P'$ will, it is true, define a positional plane $F_P$ which is spaced from the plane of symmetry $F_S$ a distance $\Delta t_P$ corresponding to the transit time, but no indication will be obtained on which side of plane $F_S$ the plane $F_P$ is located. If, however, the complete value of $\Delta t_{12}$, including its algebraic sign, is used, such algebraic sign will indicate the side of the plane $F_S$ on which the positional plane $F_P$ is located.

In the system according to the present invention, there is a particularly advantageous special case in which the numerical value of $\Delta t_P'$ is not only proportional but identical to the numerical value of $\Delta t_P$. This is so when $2\Delta t_g$ is taken as unity and when $$\Delta t_P' = (u \cdot \Delta t_{12})(v \cdot \Delta t_m)$$

where the product $u \cdot v$ must be equal to ½. In this special case the numerical value of $\Delta t_P'$ is equal to the numerical value of the transit time distance $\Delta t_P$ which the given positional plane $F_P$ is spaced from the symmetry plane $F_S$ (i.e., the distance between $F_P$ and $F_S$ expressed in terms of the transit time). If the distance between the positional plane $F_P$ and the symmetry plane $F_S$ is not to be given in units of $2\Delta t_g$ but in units of length L (e.g., kilometers or nautical miles), the product $u \cdot v$ instead of being equal to ½ will have to be equal to $$u \cdot v = \frac{\Delta t_g}{\Delta t_L}$$

where $\Delta t_L$ is the time required for the signal to travel a distance equal to the unit of length L.

The time markers can be constituted by any suitable signal, for example, by pulses, by the rising flanks of square wave signals, by phase shifts, by passages through zero or the maxima of pure sinusoidal oscillations, by amplitude or frequency changes, and so on. The time markers can be transmitted in any suitable manner, e.g. electromagnetically or acoustically.

It will be seen from the above that, in a system according to the present invention, a pair of transmission-receiver points is required in order to define a family of infinite parallel positional planes, and that each of these planes intersects at right angles a line passing through the transmitter-receiver points $E_1$, $E_2$. According to a further feature of the present invention, a network or grid of coordinate planes is obtained by means of at least two families of parallel positional planes, the arrangement being such that one family of planes intersects the other family or families of planes at the desired angle or angles, in which case the families of positional planes will constitute families of coordinate planes. Each family of coordinate planes requires one pair of transmitter-receiver points, although two or three families of coordinate planes do not require four but only at least three pairs of transmitter-receiver points because each transmitter-receiver point can form with the transmitter-receiver points of another family of planes at least two pairs of transmitter-receiver points. The desired angle of intersection between two families of coordinate planes can readily be obtained by making the line joining the transmitter-receiver points which define one family of planes intersect the line joining the transmitter-receiver points which define the other family of planes at the desired angle.

A rectangular coordinate grid can readily be obtained by using two pairs of transmitter-receiver points in which no transmitter-receiver of any one pair of transmitter-receiver points coincides with the transmitter-receiver point of any other pair of transmitter-receiver points, but in which the center of the line joining the two points of one pair coincides with the center of the line joining the two points of the other pair, and in which these two lines are at right angles to each other. The advantage of such an arrangement is that the regions of maximum accuracy will overlap to the most favorable degree.

The timer marker signals $S_{11}$ and $S_{12}$ at the receiving end of the transmission will have to be distinguished from each other only if it is necessary to determine on which side of the pertaining plane of symmetry of the transmitter-receiver points $E_1$, $E_2$, the point P is located. It is therefore not absolutely essential to make a determination, at the receiving end, whether the propagation or transit time of $S_{11}$ was longer or shorter than that of $S_{12}$. On the other hand, the time marker groups have to be identified, either directly or indirectly, on the receiving end, in order to make certain that, during the formation of the product $\Delta t_P'$, only signals of the same time marker group are used. This can be accomplished in a manner known per se, for example, by selecting sufficiently large time intervals between time marker groups. The informational time markers $S_{11}$ and $S_{12}$ within a time marker group can be identified, for example, by letting one of the transmitter-receiver points send out its informational time marker of the same time marker group later, by a time interval equal to or greater than $\Delta t_g$, than the other one of the transmitter-receiver points.

Figure 1B:
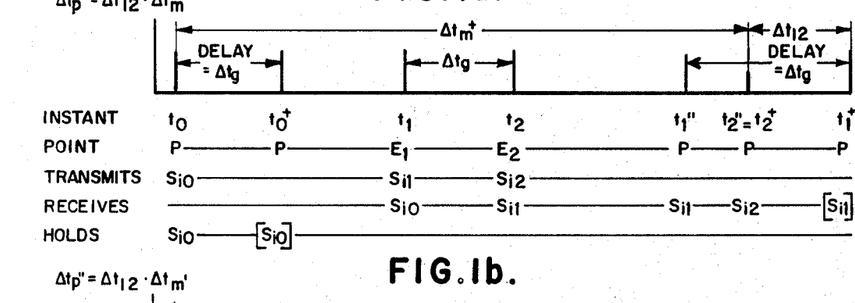

This can be done for example as shown in FIGURE 1b:

(1) The first or master transmitter-receiver point P transmits the reference time marker signal $S_{10}$ at instant $t_0$.

(2) The second transmitter-receiver at point $E_1$ receives, at $t_1$, the reference time marker signal $S_{10}$ transmitted by the first transmitter-receiver at P and thereupon transmits the informational time marker signal $S_{11}$.

(3) The third transmitter-receiver at point $E_2$ receives, at $t_2$, the signal $S_{11}$ from the second transmitter-receiver at point $E_1$ and thereupon transmits the informational time marker signal $S_{12}$.

(4) The first transmitter-receiver at P receives, at $t_1''$ and $t_2''$, respectively, the informational time marker signals $S_{11}$ and $S_{12}$ and identifies which is which by the sequence in which they arrive at P.

(5) The delayed transmission of the informational time marker signal $S_{12}$ by the transmitter-receiver at $E_2$, due to the time $\Delta t_g$ required for the informational time marker signal $S_{11}$ to travel from the transmitter-receiver at $E_1$ to the transmitter-receiver at $E_2$, is compensated for at P by delaying the reference time marker signal $S_{10}$ and the informational time marker signal $S_{11}$ by $\Delta t_g$.

Because of this time delay at P the reference time marker signal $S_{10}$ now appears at the instant $t_0^+$ (i.e. $t_0^+ = t_0 + \Delta t_g$) and the informational time marker signal $S_{11}$ now appears at the instant $t_1^+$ (i.e. $t_1^+ = t_1'' + \Delta t_g$), and the instant $t_2''$ at which the informational time marker signal $S_{12}$ is received at P is now called $t_2^+$.

(6) A determination is made of the following:

(a) Firstly, the time difference $\Delta t_{12}^+$ between the instants $t_1^+$ and $t_2^+$ at which the informational time marker signals $S_{11}$ and $S_{12}$ appear, and (b) Secondly, the time difference $\Delta t_m^+$ between the instant $t_0^+$ at which the reference time marker signal $S_{i0}$ appears and the instant $t_2^+$ at which the informational time marker signals $S_{12}$ appears.

(7) There is formed the product $\Delta t_P^+ = \Delta t_{12}^+ \cdot \Delta t_m^+$. In the above equation $\Delta t_P^+$ indicates generally a given positional plane $F_P$ which is parallel to the plane of symmetry $F_S$ of the points $E_1$ and $E_2$. Naturally, only the signals pertaining to the same time marker group will be used to form the product $\Delta t_P^+$. When $2\Delta t_g$ is taken as unity the numerical value of $\Delta t_P^+$ is identical to the numerical value of $\Delta t_P$.

If the distance between the positional plane $F_P$ containing the point P and the symmetry plane $F_S$ is not to be determined in units of $2\Delta t_g$, but in units of length, e.g., kilometers or nautical miles, the product $\Delta t_P^+$, instead of being obtained by multiplying $\Delta t_{12}^+$ and $\Delta t_m^+$, is obtained by multiplying $u'\Delta t_{12}^+$ and $v'\Delta t_m^+$, where $$u' \cdot v' = \frac{2\Delta t_g}{\Delta t_L}$$

$\Delta t_L$ being the time required for the signal to travel a distance equal to the unit of length L.

The various signals can be identified in any suitable manner. For example, the various signals can be subjected to different pulse modulations, to different modulation frequencies, be transmitted at different frequencies, and so on.

Figure 1C:
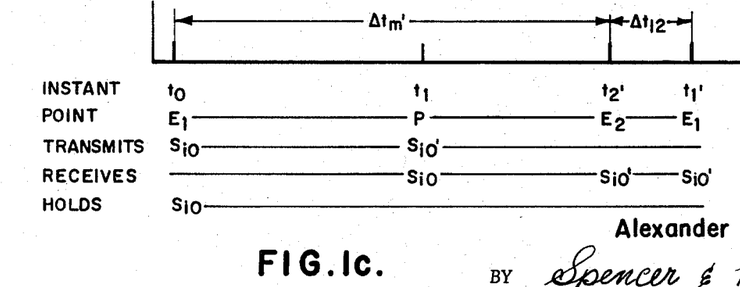

The system according to the present invention can be inverted, in a manner of speaking, if, for example, the position of a moving target is to be determined at a stationary site, e.g., if a ground station is to monitor a given air space. This can be accomplished as shown in FIGURE 1c, wherein the transmitter-receiver located at the point P which is to be plotted is now a slave station while one of the transmitter-receivers located at known points $E_1$, $E_2$, e.g., the one at $E_1$, is the master station:

(1) the transmitter-receiver at point $E_1$—which is now the master station—transmits a reference time marker signal $S_{i0}$ at instant $t_0$.

(2) The reference time marker signal $S_{i0}$ is received at the transmitter-receiver at point P at instant $t_1$ which thereupon transmits the informational time marker signal $S_{i0}'$.

(3) The informational time marker signal $S_{i0}'$ is received by the transmitter-receiver at point $E_1$ at $t_1'$ and by the transmitter-receiver at point $E_2$ at $t_2'$.

(4) A determination is made of the following:

(a) Firstly, the time difference $\Delta t_{12}$ between the instants $t_1'$ and $t_2'$ at which the informational time marker signals are received by the transmitter-receivers at $E_1$ and $E_2$, respectively, and (b) Secondly, the time difference $\Delta t_m'$ between the instant $t_0$ and the instant $t_2'$ at which the informational time marker signal is received at the transmitter-receiver at point $E_2$.

(5) There is formed the product $\Delta t_P'' = \Delta t_{12} \cdot \Delta t_m'$. In the above equation, $\Delta t_P''$ indicates generally a given positional plane $F_P$ which is parallel to the plane of symmetry of the transmitter-receiver points $E_1$, $E_2$. Naturally, only the signals pertaining to the same time marker group will be used to form the product $\Delta t_P''$.

The station at $E_1$ will be a true master station if the slave station at $E_2$, upon receiving the informational time marker $S_{i0}'$ from the slave station at P then produces its own informational time marker $S_{i2}$ which is received at the master station, at which the time differences are determined and the product formed. Alternatively, the station at $E_2$, which will receive the reference time marker signal $S_{i0}$ from $E_1$ at an instant which lags the instant $t_0$ shown in FIGURE 1c by a time interval equal to the transit time $\Delta t_g$ between stations $E_1$ and $E_2$, may be the station at which the time differences are measured and the product formed. Finally, it is possible for the various signals emanating from and received at the two stations $E_1$ and $E_2$ to be fed to a third ground station at which the necessary computation is carried out. Suitable provision will, of course, have to be made for the time delays incident to the transmission of signals from points $E_1$ and $E_2$ to the computer station.

There is a particularly advantageous special case, in which the numerical value of $\Delta t_P''$ is not only proportional but identical to the numerical value of $\Delta t_P$. This is so when an amount equal to twice the transit time distance $\Delta t_g$ between the two points $E_1$ and $E_2$, i.e., $2\Delta t_g$, is taken as unity.

If the distance between the positional plane $F_P$ containing the point P and the symmetry plane $F_S$ is not to be determined in units of $2\Delta t_g$, but in units of length, e.g., kilometers or nautical miles, the product $\Delta t_P''$, instead of being obtained by multiplying $\Delta t_{12}$ and $\Delta t_m'$, is obtained by multiplying $u'\Delta t_{12}$ and $v'\Delta t_m'$, where $$u' \cdot v' = \frac{2\Delta t_g}{\Delta t_L}$$

$\Delta t_L$ being the time required for the signal to travel a distance equal to the unit of length L.

It will be seen from the above, that when the time differences are measured, they are obtained solely from the transit times $\Delta t_{\rho 1}$ and $\Delta t_{\rho 2}$; consequently, all other delays to which the signals are subjected will have to be substantially compensated for before the measurement is taken. Additional delays of the signals can arise, for example, by intentional predetermined delays in transmitting the informational time markers in order to make possible an identification of the signals at the receiving end of the transmission, by inherent time delays in the sets used at the transmitter-receiver points, and by transmission of the signals to a common point at which the necessary computation and evaluation are done.

Figure 2:
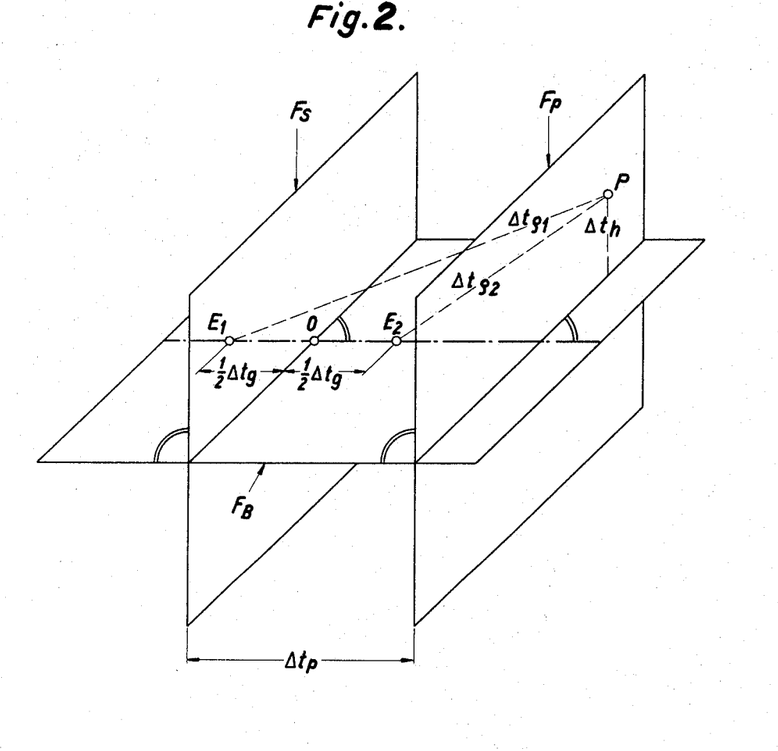
FIGURE 2 is a perspective representation showing the relative positions of the three transmitter-receiver points.

Referring now to FIGURE 2, the same shows a transmitter plane $F_B$ containing the transmitter-receiver points $E_1$, $E_2$ which constitute a pair of transmitter-receiver points, as well as the center O of the line joining the two points $E_1$, $E_2$. The plane of symmetry $F_S$ of the points $E_1$, $E_2$, i.e., the plane whose every point is equidistant from points $E_1$, $E_2$, intersects the line joining points $E_1$, $E_2$, at point O and is at right angles thereto. One half of the transit time distance between points $E_1$ and $E_2$ is indicated by $\frac{1}{2} \Delta t_g$. The positional plane $F_P$ which contains point P and is parallel to the plane of symmetry $F_S$ is spaced from the latter a transit time distance represented by $\Delta t_P$. The transit time distance between point P itself and point $E_1$ is equal to $\Delta t_{\rho 1}$ and the transit time distance between P and $E_2$ is $\Delta t_{\rho 2}$. The transit time height or altitude of point P above the plane $F_B$ is represented by $\Delta t_h$. Assuming that the determination of the position of point P is to be made at point P, e.g., assuming point P to be the master station carried aboard an aircraft whose navigator wishes to plot his position with respect to the known points $E_1$ and $E_2$ (or, insofar as FIGURE 2 is concerned, the position of the plane $F_P$), the transmitter-receiver located at P produces and transmits a train of reference time marker signal $S_{i0}$, recurring at preferably the same rate, at instants $t_0 = t_s + nT$, where $t_s$ is a fixed instant, T is the period, and $n = 0, 1, 2, 3 \ldots$. The transmitter-receiver at $E_1$ receives the reference time marker signals at instants $t_1 = t_s + nT + \Delta t_{\rho 1}$, and, after a predetermined time delay increment $\Delta t_1$, transmits its informational time marker signals $S_{11}$ at the instants $t_1' = t_s + nT + \Delta t_{\rho 1} + \Delta t_1$. The transmitter-receiver at $E_2$ receives the reference time marker signals at the instants $t_2 = t_s + nT + \Delta t_{\rho 2}$, and after a predetermined time delay increment $\Delta t_2$, transmits its informational time marker signals $S_{12}$ at the instants $t_2' = t_s + nT + \Delta t_{\rho 2} + \Delta t_2$. The transmitter-receiver at P will receive the first informational time marker signals $S_{11}$ at instants $t_1'' = t_s + nT + 2\Delta t_{\rho 1} + \Delta t_1$, while the second informational time marker signals $S_{12}$ will be received at the instants $t_2'' = t_s + nT + 2\Delta t_{\rho 2} + \Delta t_2$. By use of for example a conventional transmission technique, e.g., a pulse modulation type transmission, the informational time marker signals $S_{i1}$ and $S_{i2}$ of each time marker group will be identified at P, if the particular transmission technique is known at the point P. If $\Delta t_1 \neq 0$ and/or if $\Delta t_2 \neq 0$, at least one of the time markers of the same time marker group will be so delayed at P, by conventional means, as to simulate the reception of the time markers of a time marker group as if the following were true: that the first and second delay increments are equal to zero; that the transit time distance between the first informational time marker and the reference time marker of the same time marker group is equal to double the transit time distance between point P and transmitter-receiver point $E_1$; and that the transit time distance between the second informational time marker and the reference time marker of the same time marker group is equal to double the transit time distance between point P and the transmitter-receiver point $E_2$.

Accordingly, the time markers of the same time marker group will appear at P at the following instants:

$S_{i0}$ at the instants $t_0 = t_0 + \Delta t_0^+$
$S_{i1}$ at the instants $t_1^+ = t_1'' + \Delta t_1^+$
$S_{i2}$ at the instants $t_2^+ = t_2'' + \Delta t_2^+$ where $\Delta t_k^+$ is the transit time delay of the time marker $S_{ik}$ before $\Delta t_{12}^+$ and $\Delta t_m^+$ are determined, with $k=0, 1, 2$.

The transit time difference $\Delta t_{12}^+ = t_1^+ - t_2^+$, the transit time difference $$\Delta t_m^+ = \frac{t_1^+ + t_2^+}{2} - t_0^+$$

the particular coordinate plane in which point P lies being given by the product $\Delta t_P^+ = \Delta t_{12}^+ \cdot \Delta t_m^+$. If twice the transit time distance between the transmitter-receiver points $E_1$, $E_2$, is taken as unity, the numerical value and algebraic sign of $\Delta t_P^+$ is the numerical value and algebraic sign of the transit time distance $\Delta t_P$ which the positional plane $F_P$ is spaced from the plane of symmetry $F_S$. If $t_1^+ > t_2^+$, that is to say, if $\Delta t_{12}^+ = |\Delta t_{12}^+|$, the plotted positional plane $F_P$ lies on that side of the plane of symmetry $F_S$ which point $E_2$ lies on. Doubling the distance between the positional plane $F_P$ and the plane of symmetry $F_S$ also doubles the value of the product $\Delta t_P^+$.

Figure 2A:
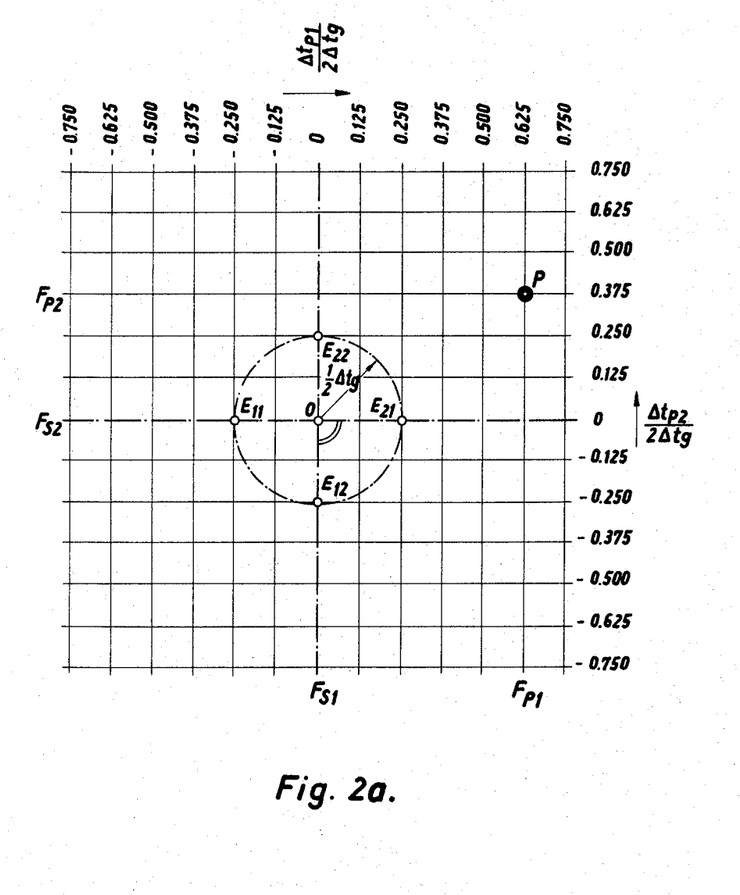
FIGURE 2a is a plan view of a transmitting plane in which the transmitter-receiver points are arranged in accordance with the present invention.

FIGURE 2a is a plan view of a transmission plane containing two pairs of transmitter-receiver points arranged to produce a rectangular or Cartesian coordinate grid. One of the pairs of transmitter-receiver points comprises the points $E_{11}$ and $E_{21}$ while the other pair of transmitter-receiver points comprises the points $E_{12}$ and $E_{22}$. The four points are spaced equidistantly apart and are arranged on a circle whose center is at O and whose radius is $\frac{1}{2}\Delta t_g$. The plane of symmetry $F_{S1}$ of the points $E_{11}$, $E_{21}$, is at right angles to the plane of symmetry $F_{S2}$ of the points $E_{12}$, $E_{22}$. Point O is located on the rectilinear intersection of the planes of symmetry $F_{S1}$ and $F_{S2}$. The coordinate planes in which point P lies are planes $F_{P1}$ and $F_{P2}$.

Assuming $2\Delta t_g = 333.3$ μsec. which corresponds to 100 kilometers, the numerical value of $\Delta t_{P1}$ would be equal to $+0.625$. The transit time distance between coordinate plane $F_{P1}$ and the plane of symmetry $F_{S1}$ would then be $\Delta t_{P1} = +0.625 \cdot 2\Delta t_g$ which corresponds to $+62.5$ kilometers. Similarly, the numerical value for $\Delta t_{P2} = +0.375$, and the distance between coordinate plane $F_{P2}$ and the plane of symmetry $F_{S2}$ is $\Delta t_{P2} = +0.375 \cdot 2\Delta t_g$ which corresponds to $+37.5$ kilometers.

Figure 3:
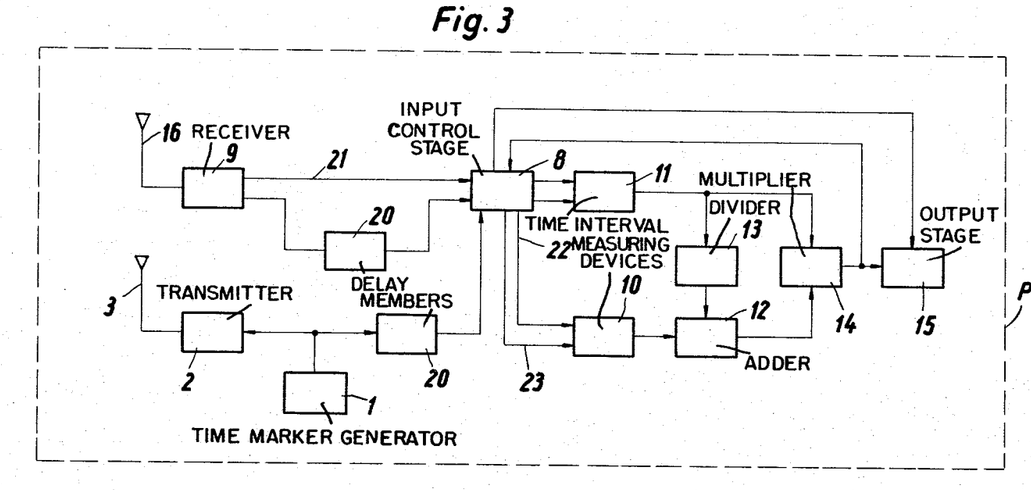
FIGURE 3 is a block diagram of a master transmitter-receiver forming part of a system according to the present invention.

FIGURE 3 is a block diagram of a master transmitter-receiver set P which may be used at point P. The set comprises a reference time marker generator 1 which is connected to a transmitter 2 having an antenna 3. The reference time marker signals $S_{i0}$ transmitted by set P are received by a slave transmitter-receiver set $E_1$ located at point $E_1$ and shown in FIGURE 4, which set $E_1$ is arranged to transmit the informational time markers $S_{i1}$ and comprises a receiving antenna 4, a receiver 5, a transmitter 6, and a transmitting antenna 7. The reference time marker signals $S_{i0}$ are also received by a further slave transmitter-receiver set $E_2$ located at $E_2$ and shown in FIGURE 5, which set $E_2$ is arranged to transmit its informational time marker signals $S_{i2}$ but only after a time delay $\Delta t_u \geq \Delta t_g$ brought about by a delay line 17 interposed between receiver 5 and transmitter 6. The informational time markers $S_{i1}$ and $S_{i2}$ are picked up by the receiving antenna 16 of set P (FIGURE 3). The signals are thus applied to a receiver 9 which separates the incoming staggered informational time marker signals and applies them to two separate outputs. This signal separation is carried out by conventional means, e.g., a flip-flop controlled gate circuit. The receiver 9 applies the informational time marker signals $S_{i1}$ to an input control stage 8 via a time delay member 20 which delays the signal by a time interval equal to $\Delta t_u$, while the informational time marker signals $S_{i2}$ are applied directly, i.e., without delay, to the input control stage 8 via a line 21. The reference time marker signal generator 1 applies the reference time marker signals $S_{i0}$ to the input control stage 8 via a further time delay member 20 which also delays the signals passing therethrough by a time interval equal to $\Delta t_u$. Inasmuch as the time intervals between the reference time marker signals are always greater than the maximum transit time of one informational time marker signal, the input control stage receives, after it has received a reference time marker signal, the two informational time marker signals pertaining to each respective reference time marker signal. The arrangement of the input control stage is such that it is opened, i.e., made ready to receive signals from the receiver 9, upon the reception of a reference time marker signal. The stage 8 is then not closed until after it has received the second informational time marker signal following the opening of the stage and can not again be opened by a new reference time marker signal until after the product $\Delta t_P^+$ has been formed.

The input control stage 8 determines the algebraic sign of the product $\Delta t_P^+$ on the basis of the timely sequence in which the informational time marker signals of the same time marker group arrive, and delivers the algebraic sign to an output stage 15 which may be in the nature of an evaluating or indicating stage.

The input control stage 8 applies the reference time marker signal and the next succeeding informational time marker signal, via lines 23 and 22, respectively, to a time interval measuring device 10, while both informational time markers are applied to a further time interval measuring device 11. The output of each of the devices 10 and 11 represents the time interval elapsed between the respective time marker signals applied thereto. The output of device 11 is applied to a divider stage 13 and to one input of a multiplier stage 14. The divider stage 13 divides the measured value by two and applies the result to one input of an adder 12 whose other input is connected to the output of the time interval measuring device 10. The output of adder 12 is applied to the input of the multiplier stage 14 which multiplies the values applied from the outputs of 11 and 12 and itself puts out, as a numerical value, the product $\Delta t_P^+$, this product value being applied to the output stage 15. The output of multiplier stage 14 is also applied to a resetting input of stage 8 so that, now that the product has been formed, it can be re-opened by the next reference time marker signal from signal generator 1.

If the distance between the positional plane $F_P$ and the plane of symmetry $F_S$ is to be represented in terms of units of length L, the first time difference $\Delta t_{12}^+$ has to be multiplied by u and the second time difference $\Delta t_m^+$ by v, as set forth above, i.e., the product has to be $u\Delta t_{12}^+ \cdot v\Delta t_m^+$. This may be accomplished by the circuit shown in FIGURE 6 which is identical to that of FIGURE 3 but incorporates a divider or multiplier stage 18 interposed between the output of the time interval measuring device 11 and the input of the multiplier stage 14 as well as a further divider or multiplier stage 19 interposed between the output of adder 12 and the other input of the multiplier stage 14, which stages 18 and 19 serve to convert the value $\Delta t_{12}^+$ coming from 11 to $u \cdot \Delta t_{12}^+$ and the value $\Delta t_m^+$ coming from 12 to $v \cdot \Delta t_m^+$, respectively. If, of course, either of the values $u$ or $v$ equals 1, the respective stage 18 or 19 would be omitted.

Figure 4:
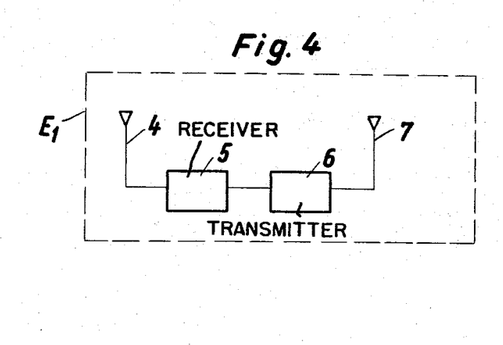
FIGURES 4 and 5 are block diagrams of repeater or slave transmitter-receivers forming part of a system according to the instant invention.
Figure 5:
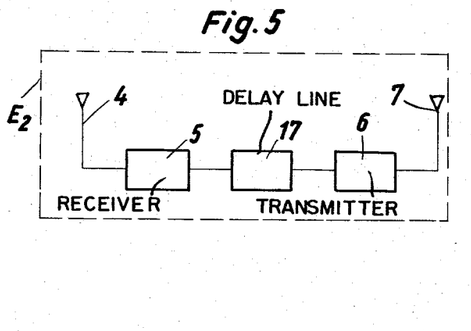
Figure 7:
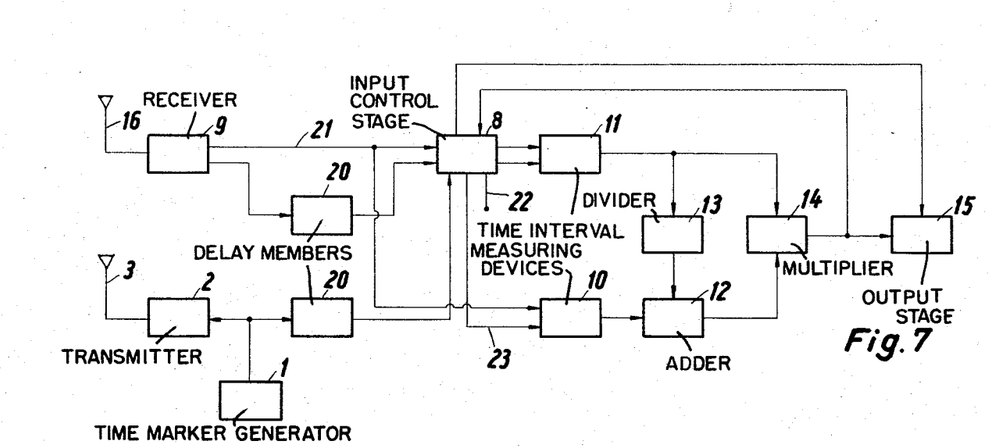
FIGURE 7 is a modification of a master transmitter-receiver forming part of a system according to the present invention.

If, for purposes of identification of the informational time marker signals, one of the slave transmitter-receivers is to receive the informational time marker signals from the other slave transmitter-receiver—instead of the reference time marker signals from P—and only then is to transmit its own informational time marker signals, the two slave transmitter-receivers can each be constituted as shown in FIGURE 4, while the master transmitter-receiver, located at point P, may be constituted as shown in FIGURE 7. The arrangement shown in FIGURE 7 is essentially similar to that of FIGURE 3 but differs therefrom in that the input of the time interval measuring device 10 is connected to the input control stage 8 only via line 23 which delivers the reference time marker signals, the other input to device 10 being connected to line 21 so that the incoming informational time marker signal will be applied directly.

Figure 6:
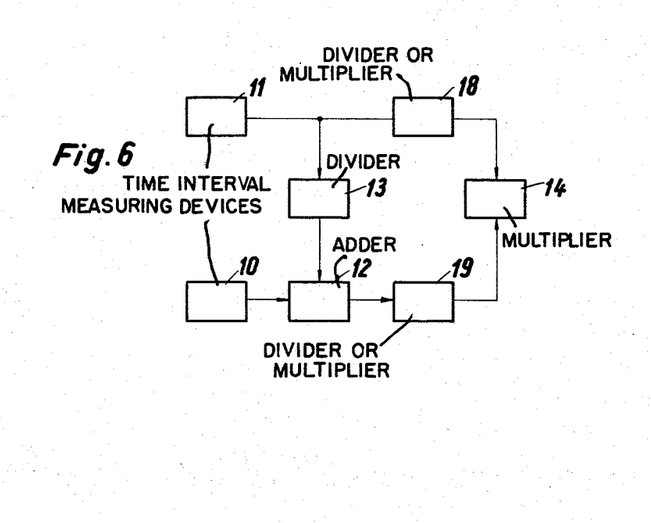
FIGURE 6 is a partial block diagram showing a modification of the transmitter-receiver of FIGURE 3.

The arrangement of FIGURE 7 may be modified by the inclusion of stages such as stages 18 and 19 shown in FIGURE 6, so that the distance measurement will be obtained in terms of units of length.

If the system is to be used in such a manner as to allow the position of plane $F_P$ to be determined at one of the points $E_1$, $E_2$, as will occur, for example, when a ground station is to monitor an air space, the transmitter-receiver at, for instance, point $E_1$, will be arranged as a master station as shown in FIGURE 7, while the transmitter-receivers at point $E_2$ and at point P will be shown in FIGURE 4, i.e., slave stations. Such a system will operate as follows:

(1) The slave transmitter-receiver at P will receive the reference time marker signals $S_{10}$ transmitted from the master station at $E_1$ and will, upon reception of such signals, itself transmit the informational time marker signal $S_{11}$.

(2) The slave transmitter-receiver at $E_2$ will receive the informational time marker signals $S_{11}$ from P and, upon reception thereof, itself transmit the informational time marker signal $S_{12}$.

(3) The transmitter-receiver at $E_1$ will receive the informational time marker signal $S_{11}$ from P and the informational time marker signal $S_{12}$ from $E_2$.

Here the delay lines 20 will have to be adjusted so as to compensate for the transit time $\Delta t_g$, i.e., the time interval required for the information time marker signal $S_{12}$ to travel from $E_2$ to $E_1$, i.e., the time marker signals $S_{10}$ and $S_{11}$ will each have to be delayed by a time interval equal to $\Delta t_g$.

The last-described arrangement may, of course, also be modified so as to include stages such as the stages 18 and 19 shown in FIGURE 6 so that the distance measurement will be obtained in terms of units of length.

Figure 8:
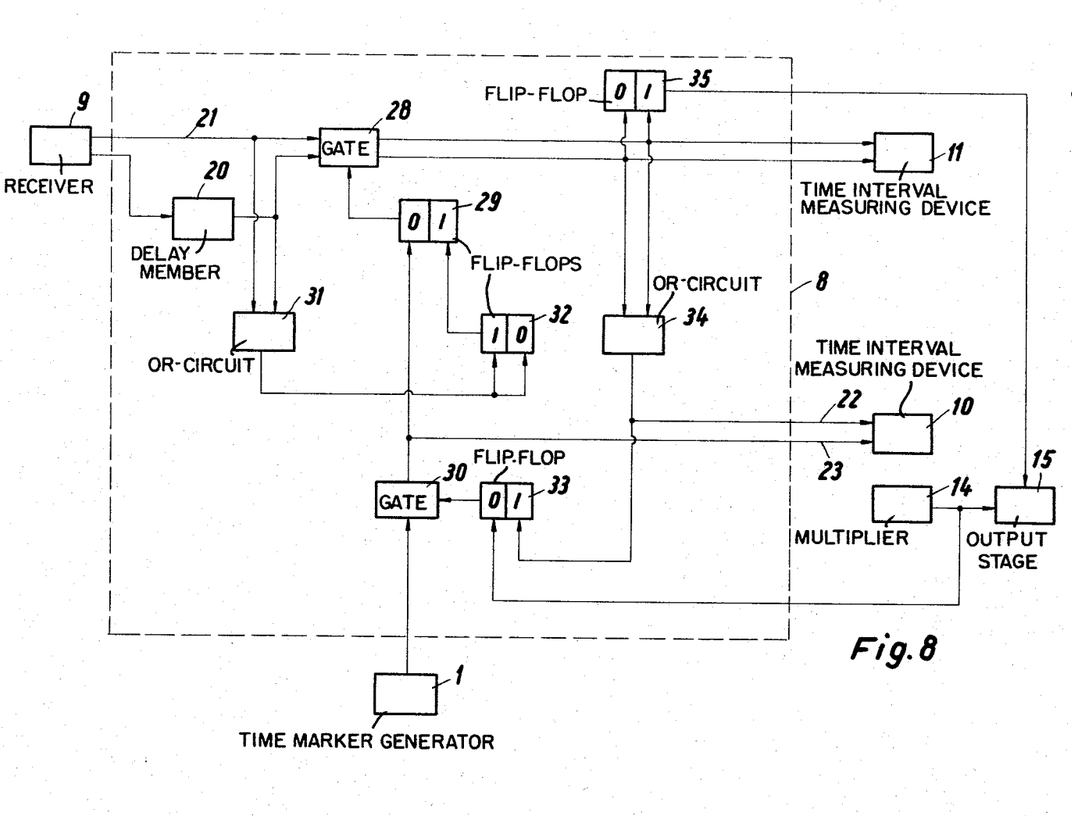
FIGURE 8 is a block diagram of one component of the master transmitter-receiver.

FIGURE 8 shows the details of the input control stage 8. This stage comprises a gate circuit 28 to which the line 21 and delay member 20 are connected, which gate circuit 28 is controlled by the reference time marker signal generator 9 via a gate circuit 30 and a flip-flop circuit 29. This line 21 and delay member 20 are also connected to an OR-circuit 31 whose output signal triggers a flip-flop circuit 32 so that the flip-flop circuit 29 is triggered into the illustrated position only by the informational time marker last appearing at the input of the gate circuit 28, whereupon the latter is again closed. When a signal appears at the output of the multiplier stage 14, the gate circuit 30 is opened by means of a further flip-flop circuit 33. The output of gate circuit 28 is also connected to an OR-circuit 34 whose output signal triggers the flip-flop circuit 33 into the illustrated position, thereby closing gate circuit 30. The output signals of OR-circuit 34 are applied to the time interval measuring device 10 as well as to the gate circuit 30. Also connected to the output of gate circuit 28 is yet another flip-flop circuit 35 by means of which the algebraic sign of $\Delta t_P$ is determined, the output signals of which flip-flop circuit 35 are applied to the output stage 15.

It will be understood that the above description of the present invention is susceptible to various modifications, changes, and adaptations, and the same are intended to be comprehended within the meaning and range of equivalents of the appended claims.

What is claimed is:

1. A system of the character described, including a first transmitter-receiver located at an unknown point P, a second transmitter-receiver located at a known point $E_1$, and a third transmitter-receiver located at another known point $E_2$, said first transmitter-receiver being a master station and the other two transmitter-receivers being slave stations; said master station comprising means for transmitting a reference time marker signal $S_{10}$ at an instant $t_0$; said slave station at $E_1$ comprising means for receiving said signal $S_{10}$ at an instant $t_1$ and for thereupon transmitting an informational time marker signal $S_{11}$; said slave station at $E_2$ comprising means for receiving said signal $S_{10}$ and at instant $t_2$ and for thereupon transmitting an informational time marker signal $S_{12}$; said master station further comprising means for receiving said signals $S_{11}$ and $S_{12}$ at instants $t_1'$ and $t_2'$, respectively, means for determining the time difference $\Delta t_{12}$ between said instants $t_1'$ and $t_2'$, means for determining the time difference $\Delta t_m$ which is half the sum of the time difference between $t_0$ and $t_1'$ and the time difference between $t_0$ and $t_2'$, and means for producing the product $\Delta t_P' = \Delta t_{12} \cdot \Delta t_m$, thereby to define a particular positional plane which contains said point P and which is at right angles to a straight line drawn through said points $E_1$ and $E_2$ and hence a positional plane containing said point P, the position of which plane is fixed with respect to said known points $E_1$ and $E_2$.

2. A system as defined in claim 1 wherein said means for determining said time difference $\Delta t_{12}$ determine only the absolute value thereof.

3. A system as defined in claim 1 wherein said means for determining said time difference $\Delta t_{12}$ determine the magnitude and algebraic sign thereof.

4. A system as defined in claim 1 wherein half of said product $\Delta t_P'$ is formed.

5. A system as defined in claim 1 wherein said positional plane is determined in terms of units of length L which said positional plane is spaced from the plane of symmetry of said known points $E_1$ and $E_2$, said master station further including means for multiplying said time difference $\Delta t_{12}$ by $u$ and means for multiplying said time difference $\Delta t_m$ by $v$, and means for producing the product $(u \cdot \Delta t_{12}) \cdot (v \cdot \Delta t_m)$, where $$u \cdot v = \frac{\Delta t_g}{\Delta t_L}$$

where $\Delta t_g$ is the transit time of a signal travelling between said points $E_1$ and $E_2$, $\Delta t_L$ is the transit time of a signal travelling said distance L, and $2\Delta t_g$ is the unit of time of said time differences.

6. A system as defined in claim 1 wherein one of said slave stations further comprises means for delaying the transmission of its informational time marker signal by a time interval equal to at least the transit time of a signal travelling between said points $E_1$ and $E_2$, thereby allowing an identification of said informational time marker signals $S_{11}$ and $S_{12}$ to be made by said master station on the basis of the sequence in which said informational time marker signals are received.

7. A system as defined in claim 6 wherein said master station further comprises time delay means arranged ahead of said two time difference determining means for delaying the reference time marker signal and the informational time marker signal emanating from the other of said slave stations by an amount of time equal to that by which said one slave station delays the transmission of its informational time marker signal, thereby to compensate for the time delay effected by said one slave station.

8. A system as defined in claim 1, there being a set of further known points $E_{12}$ and $E_{22}$ at which there are located means similar to those which are located at said points $E_1$ and $E_2$, the straight line joining said points $E_1$ and $E_2$ intersecting the straight line joining said points $E_{12}$ and $E_{22}$.

9. The combination defined in claim 8 wherein said straight lines are at least approximately at right angles and at least approximately bisect each other.

10. The combination defined in claim 8 wherein one of said points $E_1$ and $E_2$ coincides with one of said points $E_{12}$ and $E_{22}$.

11. A system of the character described, including a first transmitter-receiver located at an unknown point P, a second transmitter-receiver located at a known point $E_1$, and a third transmitter-receiver located at another known point $E_2$, said first transmitter-receiver being a master station and the other two transmitter-receivers being slave stations; said master station comprising means for transmitting a reference time marked signal $S_{10}$ at an instant $t_0$; said slave station at $E_1$ comprising means for receiving said signal $S_{10}$ at an instant $t_1$ and for thereupon transmitting an informational time marker signal $S_{11}$; said slave station at $E_2$ comprising means for receiving said signal $S_{11}$ at an instant $t_2$ and for thereupon transmitting an informational time marker signal $S_{12}$; said master station further comprising means for receiving said signals $S_{11}$ and $S_{12}$ at instants $t_1''$ and $t_2''$, respectively, and identifying them by the sequence in which they are received, time delay means for delaying the reference time marker signal $S_{10}$ and the informational time marker signal $S_{11}$ thereby to produce a compensation for the delay with which said slave station at $E_2$ transmits its informational time marker signal $S_{12}$ as a result of the transit time between $E_1$ and $E_2$, means for determining the time difference $\Delta t_{12}^+$ between the instants at which the informational time marker signal $S_{11}$ and $S_{12}$ appear after said compensation, means for determining the time difference $\Delta t_m^+$ between the instants at which the reference time marker signal $S_{10}$ and the informational time marker signal $S_{12}$ appear after said compensation, and means for producing the product $\Delta t_P^+ = \Delta t_{12}^+ \cdot \Delta t_m^+$, thereby to define a particular positional plane which contains said point P and which is at right angles to a straight line drawn through said points $E_1$ and $E_2$ and hence a positional plane containing said point P, the position of which plane is fixed with respect to said known points $E_1$ and $E_2$.

12. A system as defined in claim 11 wherein said positional plane is determined in terms of units of length L which said positional plane is spaced from the plane of symmetry of said known points $E_1$ and $E_2$, said master station further including means for multiplying said time difference $\Delta t_{12}^+$ by $u'$ and means for multiplying said time difference $\Delta t_m^+$ by $v'$, and means for producing the product $(u' \cdot \Delta t_{12}^+) \cdot (v' \cdot \Delta t_m^+)$, where $$u' \cdot v' = \frac{2\Delta t_g}{\Delta t_L}$$

where $\Delta t_g$ is the transit time of a signal travelling between said points $E_1$ and $E_2$, $\Delta t_L$ is the transit time of a signal travelling said distance L, and $2\Delta t_g$ is the unit of time of said time differences.

13. A system as defined in claim 11, there being a set of further known points $E_{12}$ and $E_{22}$ at which there are located means similar to those which are located at said points $E_1$ and $E_2$, the straight line joining said points $E_1$ and $E_2$ intersecting the straight line joining said points $E_{12}$ and $E_{22}$.

14. The combination defined in claim 13 wherein said straight lines are at least approximately at right angles and at least approximately bisect each other.

15. The combination defined in claim 13 wherein one of said points $E_1$ and $E_2$ coincides with one of said points $E_{12}$ and $E_{22}$.

16. A system of the character described, including a first transmitter-receiver located at an unknown point P, a second transmitter-receiver located at a known point $E_1$, and a third transmitter-receiver located at another known point $E_2$, said second transmitter-receiver being a master station and the other two transmitter-receivers being slave stations; said master station comprising means for transmitting a reference time marker signal $S_{10}$ at an instant $t_0$; said slave station at P comprising means for receiving said signal $S_{10}$ at an instant $t_1$ and for thereupon transmitting an informational time marker signal $S_{10}'$; said slave station at $E_2$ comprising means for receiving said informational time marker signal $S_{10}'$ at an instant $t_2'$; said master station further comprising means for receiving said informational time marker signal $S_{10}'$ at an instant $t_1'$; said system further comprising means associated with said stations at $E_1$ and $E_2$ for determining the time difference $\Delta t_{12}$ between said instants $t_1'$ and $t_2'$, means for determining the time difference $\Delta t_m'$ between $t_0$ and $t_2'$, and means for producing the product $$\Delta t_P'' = \Delta t_{12} \cdot \Delta t_m'$$

thereby to define a particular positional plane which contains said point P and which is at right angles to a straight line drawn through said points $E_1$ and $E_2$ and hence a positional plane containing said point P, the position of which plane is fixed with respect to said known points $E_1$ and $E_2$.

17. A system as defined in claim 16 wherein said positional plane is determined in terms of units of length L which said positional plane is spaced from the plane of symmetry of said known points $E_1$ and $E_2$, said master station further including means for multiplying said time difference $\Delta t_{12}$ by $u'$ and means for multiplying said time difference $\Delta t_m'$ by $v'$, and means for producing the product $(u \cdot \Delta t_{12}) \cdot (v' \cdot \Delta t_m')$, where $$u' \cdot v' = \frac{2\Delta t_g}{\Delta t_L}$$

where $\Delta t_g$ is the transit time of a signal travelling between said points $E_1$ and $E_2$, $\Delta t_L$ is the transit time of a signal travelling said distance L, and $2\Delta t_g$ is the unit of time of said time differences.

18. A system of the character described comprising, in combination: means located at a first known point $E_1$ for transmitting a reference time marker signal $S_{10}$ at an instant $t_0$; means located at an unknown point P for receiving said signal $S_{10}$, at an instant $t_1$ and for thereupon transmitting an informational time marker signal $S_{10}'$, means located at another known point $E_2$ for receiving said informational time marker signal $S_{10}'$ at an instant $t_2'$; means located at said first point for receiving said informational time marker signal $S_{10}'$ at an instant $t_1'$; and, associated with at least one of said known points, means for determining the time difference $\Delta t_{12}$ between said instants $t_1'$ and $t_2'$, means for determining the time difference $\Delta t_m'$ between $t_0$ and $t_2'$, and means for producing the product $\Delta t_P'' = \Delta t_{12} \cdot \Delta t_m'$, thereby to define a particular positional plane which contains said point P and which is at right angles to a straight line drawn through said points $E_1$ and $E_2$ and hence a positional plane containing said point P, the position of which plane is fixed with respect to said known points $E_1$ and $E_2$.

19. A system as defined in claim 18, there being a set of further known points $E_{12}$ and $E_{22}$ at which there are located means similar to those which are located at said points $E_1$ and $E_2$, the straight line joining said points $E_1$ and $E_2$ intersecting the straight line joining said points $E_{12}$ and $E_{22}$.

20. The combination defined in claim 19 wherein said straight lines are at least approximately at right angles and at least approximately bisect each other.

21. The combination defined in claim 19 wherein one of said points $E_1$ and $E_2$ coincides with one of said points $E_{12}$ and $E_{22}$.

22. In a system of the character described, a master transmitter-receiver comprising, in combination: a transmitter; a reference time marker signal generator connected to the input of said transmitter; a first time delay member having its input connected to said generator; a receiver for receiving informational time marker signals; a second time delay member having its input connected to the output of said receiver; an input stage connected to the outputs of said two time delay members and also to the output of said receiver, said input stage being opened upon the reception of a reference time marker signal from said generator and not closed until after it has received the second informational time marker signal following the opening of the stage; a first time interval measuring device connected to said input stage for measuring the time interval between said reference time marker signal and the first received informational time marker signal; a second time interval measuring device connected to said input stage for measuring the time interval between said two informational time marker signals; a divider stage connected to the output of said second time interval measuring device; an adder stage having two inputs connected, respectively, to the output of said first time interval measuring device and to the output of said divider stage; a multiplier stage having two inputs connected, respectively, to the output of said second time interval measuring device and to the output of said adder stage, the output of said multiplier stage being connected to a resetting input of said input stage to allow the same to be reopened by a subsequent reference time marker signal; and an output stage connected to the output of said multiplier stage.

23. The combination defined in claim 22 wherein said first time interval measuring device has two inputs connected to said input stage.

24. The combination defined in claim 22 wherein said first time interval measuring device has one input connected to said input stage and another input connected to said receiver.

25. The combination defined in claim 22, further comprising a first multiplier interposed between the output of said second time interval measuring device and the corresponding input of said multiplier stage and a second multiplier interposed between the output of said adder stage and the corresponding input of said multiplier stage.

26. The combination defined in claim 22 wherein said input stage comprises a first gate circuit to which the informational time marker signals are applied; a first flip-flop circuit for controlling said first gate circuit; a second gate circuit connected to one input of said first flip-flop circuit, said generator for producing the reference time marker being connected to one input of said second gate circuit; a first OR-circuit to which the informational time marker signals are applied; a second flip-flop circuit having both of its inputs connected to the output of said first OR-circuit, the output of said second flip-flop circuit being connected to another input of said first flip-flop circuit; a third flip-flop circuit having its output connected to another input of said second gate circuit, one input of said third flip-flop circuit constituting said resetting input of said input stage and being connected to the output of said multiplier stage; and a second OR-circuit having its inputs connected to the output of said first gate circuit and its output connected to another input of said third flip-flop circuit; said first time interval measuring device being connected to the output of said second gate circuit and to the output of said second OR-circuit; and said second time interval measuring device being connected to the output of said first gate circuit.

27. A system as defined in claim 2 wherein half of said product $\Delta t_p'$ is formed.

28. A system as defined in claim 3 wherein half of said product $\Delta t_p'$ is formed.

29. A system as defined in claim 1 wherein said proportional plane is determined in terms of units of length L which said positional plane is spaced from the plane of symmetry of said known points $E_1$ and $E_2$, said master station further including means for producing the product $w \cdot \Delta t_p'$ where $$w = \frac{\Delta t_g}{\Delta t_L}$$

where $\Delta t_g$ is the transit time of a signal travelling between said points $E_1$ and $E_2$, $\Delta t_L$ is the transit time of a signal travelling said distance L, and $2\Delta t_g$ is the unit of time of said time differences $\Delta t_{12}$ and $\Delta t_m$, respectively.

30. A system as defined in claim 11 wherein said means for determining said time difference $\Delta t_{12}{}^+$ determine only the absolute value thereof.

31. A system as defined in claim 11 wherein said means for determining said time difference $\Delta t_{12}{}^+$ determine the magnitude and algebraic sign thereof.

32. A system as defined in claim 16 wherein said means for determining said time difference $\Delta t_{12}$ determine only the absolute value thereof.

33. A system as defined in claim 16 wherein said means for determining said time difference $\Delta t_{12}$ determine the magnitude and algebraic sign thereof.

References Cited

UNITED STATES PATENTS

| | | | |
|---|---|---|---|
| 2,991,011 | 7/1961 | Shuck | 235—150.272 |
| 3,016,533 | 1/1962 | Frank | 235—150.272 X |
| 3,020,545 | 2/1962 | Losher | 235—150.272 X |

MALCOLM A. MORRISON, *Primary Examiner.*

I. KESCHNER, *Assistant Examiner.*